No. 733,047.

Patented July 7, 1903.

UNITED STATES PATENT OFFICE.

GEORGE FRANÇOIS JAUBERT, OF PARIS, FRANCE.

PROCESS OF MANUFACTURING HYDRATE OF CALCIUM PEROXID.

SPECIFICATION forming part of Letters Patent No. 733,047, dated July 7, 1903.

Original application filed December 27, 1900, Serial No. 41,249. Divided and this application filed April 13, 1903. Serial No. 152,398. (No specimens.)

*To all whom it may concern:*

Be it known that I, GEORGE FRANÇOIS JAUBERT, a citizen of the Republic of Switzerland, but now residing at Paris, France, have invented certain new and useful Improvements in the Manufacture of Hydrates of the Alkaline-Earths and other Dioxids and in Their Application to Bleaching, of which the following is a specification.

My invention relates to the manufacture of hydrates of the alkaline-earth and other dioxids and in their application to bleaching, and the present application for a patent is a division of the application filed by me under date of December 27, A. D. 1900, and serially numbered 41,249.

I have discovered that hydrates of sodium dioxid may be advantageously employed in the preparation by a double decomposition of the hydrates of the alkaline-earth and other dioxids. What is meant by "hydrate of bioxid of sodium" is the bodies corresponding to the formula $Na_2O_2 + 2$ to $10H_2O$.

Hitherto the hydrates of the alkaline-earth dioxids have only been prepared by the action of natural oxygenized water upon a solution of corresponding alkaline-earth hydrates. The hydrates of bioxids of lime, baryta, strontia have for formulæ

$CaO_2 + 2$ to $4H_2O$; $SrO_2 + 8H_2O$; $BaO_2 + 8H_2O$.

The hydrates of the alkaline-earth peroxids have only been utilized for making a purer and more stable oxygenized water by removing the metal in an insoluble form—for example, as a sulfate, phosphate, or fluosilicate; but these hydrates, particularly those of calcium, have not been industrially manufactured.

I have discovered that the hydrate of sodium dioxid in the presence of alkaline-earth hydrates gives off its oxygen to them in the same manner as oxygenized water, causing formation of hydrates of the alkaline-earth peroxids and caustic soda. I have also found that by replacing solutions of alkaline-earth hydrates necessarily very poor in oxygen hitherto alone employed for the preparation of the hydrates of the peroxids by the alkaline-earth hydrates in a dry or pasty state or in a milk state there is obtained even better economical results in that more concentrated caustic soda is recuperated. I have found that I arrive at the same result by replacing the alkaline-earth hydrates with soluble salts—such as the chlorids, oxychlorids, sucrates, and the like. I may mention as an example the preparation of the hydrate of calcium dioxid by the aid of milk of lime. The lime I employ is in a solid state in suspension in water and although not dissolved I transform it entirely, so as to secure a return of ninety-seven per cent. of peroxid of lime in an amorphous condition less hydrated and which can be dried without appreciable decomposition and can therefore be utilized in the industries. Furthermore, by reason of the employment of the solid lime in suspension in water I am able to reinforce the solution of concentrated caustic soda, having much value due to the concentration by test reaching ten per cent. The milk of lime obtained from fifty-six kilograms of quicklime is mixed with a solution of hydrate of sodium dioxid corresponding to seventy-eight kilograms of actual sodium dioxid in one thousand liters of cold water and the mixture stirred as long as the presence of appreciable quantities of hydrate of sodium dioxid in solution can be detected. When the action is ended, the solution of caustic soda is filtered off, the hydrate of calcium dioxid collected, washed with water, and dried.

The hydrates of the alkaline-earth peroxids and especially the hydrate of calcium dioxid may be employed with advantage for bleaching wool, feathers, and other matter and for oxidizing processes in general.

Having thus described the nature and object of my invention, what I claim as new, and desire to secure by Letters Patent, is—

The process of manufacturing hydrate of calcium peroxid, which consists in treating milk of lime with a solution of hydrate of sodium dioxid, agitating during presence of any appreciable amount of hydrate of sodium dioxid in the solution, then filtering the hydrate of sodium dioxid collected, then washing with water and finally drying the same, substantially as and for the purposes described.

In testimony whereof I have hereunto set my signature in the presence of two subscribing witnesses.

GEORGE FRANÇOIS JAUBERT.

Witnesses:
PAUL DE MESTRAL,
AUGUSTUS E. INGRAM.